Oct. 21, 1930.   W. I. McLAUGHLIN   1,778,981
PROTRACTOR
Original Filed May 20, 1924
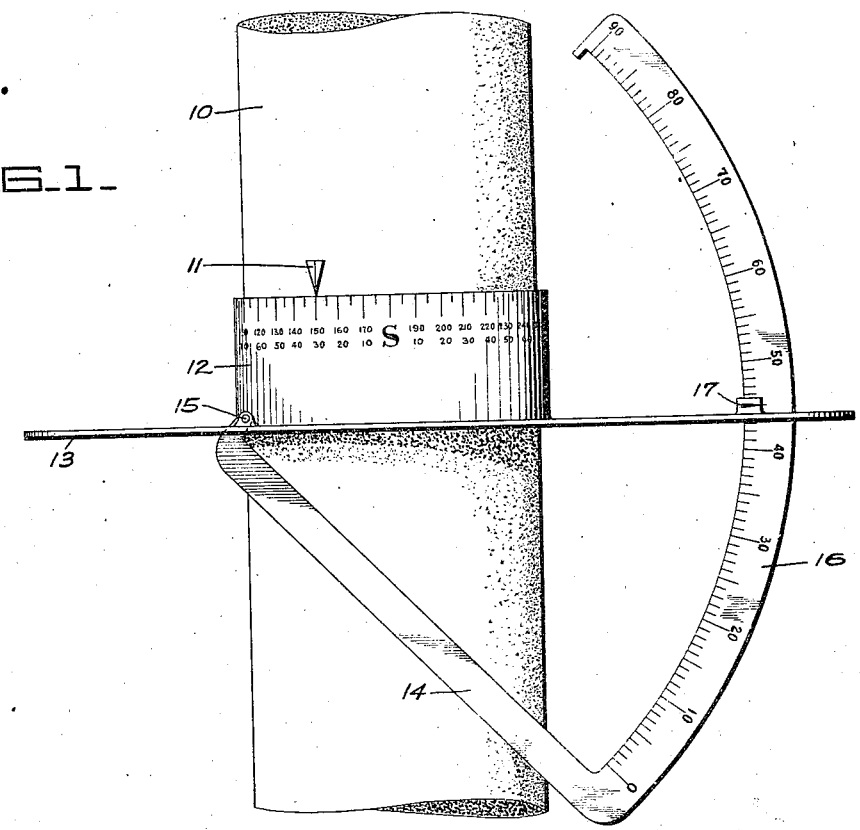
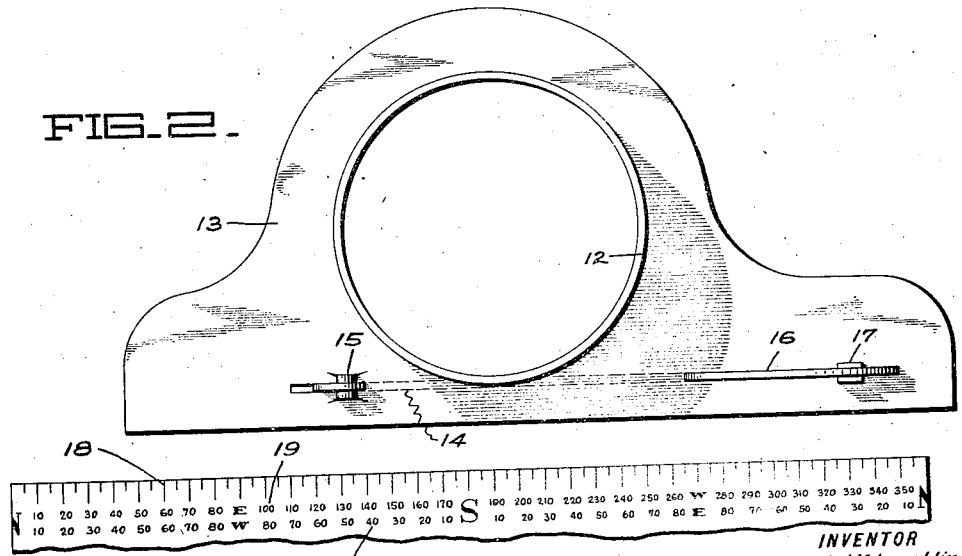
INVENTOR
William I. McLaughlin
BY White Frost
his ATTORNEYS Patented Oct. 21, 1930

1,778,981

UNITED STATES PATENT OFFICE

WILLIAM I. McLAUGHLIN, OF SAN FRANCISCO, CALIFORNIA, ASSIGNOR, BY MESNE ASSIGNMENTS, TO STANDARD OIL COMPANY OF CALIFORNIA, OF SAN FRANCISCO, CALIFORNIA, A CORPORATION OF DELAWARE

PROTRACTOR

Original application filed May 20, 1924, Serial No. 714,668. Divided and this application filed November 23, 1925. Serial No. 70,779.

The device of this invention is intended to be used in determining the dip or declination of a stratum of subterranean rock. By dip or declination is meant the angle which the surface of a stratum makes with respect to a horizontal plane. It is very convenient to be able to determine the angle of this dip and the direction of the maximum dip in drilling wells for water, oil, or gas and in prospecting for minerals.

It is an object of this invention to devise a protractor to be positioned upon a core taken from the strata of rock and which will give an accurate measurement of the maximum dip of this stratum.

It is a further object of this invention to devise a protractor which will give an accurate measurement of the direction of the maximum dip of a stratum of rock with respect to the points of the compass.

Further objects of the invention will appear from the following description in which I set forth the preferred embodiment of my invention.

Referring to the drawings:

Figure 1 is a side view of the protractor as positioned upon a core.

Figure 2 is a plan view of the protractor removed from the core.

Figure 3 is a detail view showing a development of the graduations on the protractor sleeve.

This application is a divisional case of my application Serial No. 714,668, filed May 20th, 1924. In this latter application there is disclosed a particular type of core drill for taking samples of rock from a subterranean stratum. It is preferable to employ this type of drill for obtaining a core upon which measurements may be taken with the protractor disclosed in this case.

Core drills of this type are provided with a core retainer into which the core extends as the drilling proceeds. This core retainer is provided with a plurality of spring fingers extending from vertically spaced points from the inner side of the retainer. These spring fingers engage the surface of the core and keep the retainer stationary with respect to the core. In case the core becomes fractured into a plurality of portions and one or more of these portions rotates with respect to the retainer, these spring fingers will mark upon the surface of the core. After removal of the core it is possible to rotate the core portions back into their original relative positions which they originally occupied by referring to these marks. The core retainer is also provided with a magnetic needle which normally is freely pivoted but which is fixed with respect to the retainer just before lifting the core out of the earth. By noting the position of this needle a direction mark may be placed upon the core which will indicate the position which the core originally occupied in the earth. In case the core rotates relative to the core retainer after this magnetic needle is fixed with respect to the retainer, such rotation will also be indicated by marks upon the core and the position of the direction point may be corrected to compensate for such rotation. The device of this invention is a protractor which is adapted to be positioned over such a core and which will facilitate taking certain measurements of the strata which are defined upon the core.

By referring to Fig. 1 of the drawing there is shown a core 10 which has been taken thru the strata of rock which it is desired to measure. This core 10 has been shown as provided with a mark 11 which in this case indicates the original north direction point of the core. The protractor is adapted to be positioned over this core and is accordingly provided with a positioning member for fixing the relative position of the protractor with respect to the axis of the core. This positioning member is preferably in the form of a sleeve 12 which is cylindrical in shape to fit the outer surface of the core. Secured to the sleeve 12 there is a plate 13 which is positioned in a plane normal to the axis of the sleeve. In order to measure the angle which the plane of the strata makes with respect to the axis of the core, there is provided a straight edge or arm 14 which is preferably pivoted to the plate 13 at 15 in order to swing beneath the plate thru an arc of 90°. This straight edge is also positioned so as to swing in a plane which is tangent to the inner cylindrical surface of the sleeve 12. Secured to the outer end of this straight edge 14 there is an arcuate measuring scale 16 extending up thru the plate 13 and which is graduated to read in degrees from zero to 90°. This scale cooperates with the pointer 17 which is fixed with respect to the plate 13. By referring to this pointer and the graduations on the scale 16 the angular position of the straight edge 14 with respect to the plate 13 can be determined.

The sleeve 12 is also graduated to give an indication of the direction taken by the maximum dip. The graduations on the sleeve preferably comprise markings 18 which divide the periphery of the sleeve into a plurality of equal spaces. These markings are identified by two different rows of figures 19 and 20 placed one above the other. The compass points north, south, east and west are also marked upon the sleeve by the letters N, E, S and W which are distributed at equidistant points about the sleeve so that the north-south line intersects the east-west line at 90° and thru the axis of the core. It is also preferably to locate the north-south line at right angles to the plane of the straight edge 14. The upper row of figures 19 are employed to give a measurement of the angular relation between the mark 11 on the core and the north point (N) on the sleeve. The lower figures 20 are used to measure the angular relationship between the mark 11 and the nearest north (N) or south (S) point on the sleeve. Accordingly the upper row of figures preferably reads from zero to 360° in a counterclockwise direction about the circumference of the sleeve beginning with the north (N) point. The lower row preferably reads from zero to 90° reading from both the north (N) and south (S) points on the sleeve and in both clockwise and counterclockwise directions so that the 90° position will coincide with the east and west points on the sleeve.

In using this protractor it is positioned upon the core in a manner shown in Fig. 1. The observer sights upon a line normal to the plane of the straight edge 14 and positions this straight edge to coincide with the surface line of a rock stratum. Since the surface of this stratum will be substantially a plane its outline on the surface of the core will appear as a straight line when viewed at right angles to the direction of maximum dip. When this straight edge has been properly positioned the reading of the scale 16 at the point 17 will give a measurement of the maximum dip of this stratum. Now referring to the direction point 11 on the core the upper row of figures 19 will give the deviation of the direction of the maximum dip from the north point of the compass which in this case will be 150°. Referring to the lower row of figures 20, these figures will show the deviation of the direction of maximum dip from the nearest north or south points of the compass. In this particular case this would be 30° from the south point of the compass. Thus it is seen that there has been provided a protractor which gives an accurate measurement of the maximum dip of a rock stratum and also determines the direction of the maximum dip with respect to the points of the compass.

I claim:

1. A dip protractor comprising a body member for positioning said protractor on a cylindrical core, said member having graduations for indicating the angular adjustment of said protractor about the axis of the core to a point marked on the core, and means for positioning said body member upon the core in accordance with the direction of the maximum declination of a stratum of rock in the core.

2. A dip protractor comprising a positioning member for positioning the protractor upon a cylindrical core, and a graduated member for indicating the amount of maximum declination of a rock stratum in the core, said positioning member having graduations for indicating the angular relation between a compass direction point on the core and the direction of maximum dip.

3. A dip protractor comprising a cylindrical member adapted to be positioned on a core, said cylindrical member having graduations about its periphery to indicate the angular adjustment of the protractor about the axis of the core to a point marked on the core, and a straight edge pivotally connected to said member to determine if said member is positioned in accordance with the direction of the maximum declination of a stratum of rock in the core.

4. A dip protractor comprising a positioning member adapted to position the protractor upon a cylindrical core, said positioning member having annular graduations encompassing the core, a straight edge member connected to said positioning member and adapted to be adjusted to various angular positions with respect to said positioning member about an axis transverse to the axis of the core, said straight edge member having a graduated scale associated therewith to indicate the angular relationship between said positioning member and said straight edge member.

5. A dip protractor comprising a positioning member adapted to receive a cylindrical core, a straight-edge member pivotally connected to the positioning member to permit the angular relation between the straight edge and the positioning member to be varied, and an arcuate scale extending from said straight edge, said positioning member having a point of reference whereby the amount of dip of a stratum of the core may be measured by reference to said scale.

6. A dip protractor comprising a hollow cylindrical positioning member, a straight arm pivotally connected to said positioning member to swing about an axis tangent to the inner surface of said positioning member, and means for indicating the angular position of said arm relative to a plane normal to the axis of said positioning member.

7. A dip protractor comprising a cylindrical sleeve, a plate secured to said sleeve and positioned normal to the axis of said sleeve, an arm pivoted to said plate to swing in a plane tangent to the inner surface of the sleeve, and an arcuate scale extending from the end of the arm and past the plate, said plate having a reference point adjacent said scale.

8. A dip protractor comprising a sleeve, said sleeve having graduations on its outer surface about the periphery thereof, said graduations being identified with north, east, south, and west positions spaced 90 degrees apart and having two scales of figures, one reading from 0 to 360 degrees beginning from the north position, and the other reading from 0 to 90 degrees beginning at both north and south positions and progressing toward both east and west positions, and a straight edge pivotally connected to the sleeve.

9. A dip protractor comprising a positioning member adapted to be positioned on a cylindrical core, said positioning member having graduations about its periphery to determine its relative angular relation with respect to a direction marked on the core, a straight edge member, and means for pivotally connecting the straight edge member to said positioning member whereby said straight edge member may be swung about an axis substantially normal to the axis of a core positioned in said positioning member, said straight edge member serving as means for positioning the positioning member in accordance with the direction of the maximum declination of a rock stratum in the core.

In testimony whereof, I have hereunto set my hand.

WILLIAM I. McLAUGHLIN.